(12) United States Patent
Clark et al.

(10) Patent No.: US 10,282,417 B2
(45) Date of Patent: May 7, 2019

(54) CONVERSATIONAL LIST MANAGEMENT (71) Applicant: INTERNATIONAL BUSINESS MACHINES CORPORATION, Armonk, NY (US)

(72) Inventors: Adam T. Clark, Mantorville, MN (US); Jeffrey K. Huebert, Rochester, MN (US); Aspen L. Payton, Byron, MN (US); John E. Petri, St. Charles, MN (US)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 15/048,057

(22) Filed: Feb. 19, 2016

(65) Prior Publication Data

US 2017/0242845 A1    Aug. 24, 2017

(51) Int. Cl.
*G06F 17/20* (2006.01)
*G06F 17/27* (2006.01)
(Continued)

(52) U.S. Cl.
CPC .......... *G06F 17/277* (2013.01); *G06F 17/279* (2013.01); *G06F 17/30702* (2013.01)

(58) Field of Classification Search
CPC ......... G06F 17/30867; G06F 17/30554; G06F 17/2785; G06F 17/30684; G06F 17/28; G06F 17/271; G06F 17/277; G06F 17/27; G06F 17/30979; G06F 17/2881; G06F 17/30734; G06F 17/21; G06F 17/2715; G06F 17/2775; G06F 17/30023; G06F 17/30; G06F 3/0482; G06F 3/0484; G06F 17/30395; G06F 17/30964; G06F 17/30967; G06F 17/30424; G06F 17/30548;
(Continued)

(56) References Cited

U.S. PATENT DOCUMENTS 5,752,230 A * 5/1998 Alonso-Cedo .......... G10L 15/26
                                                                704/270
5,794,050 A * 8/1998 Dahlgren ............... G06F 17/271
                                                                707/E17.074
(Continued)

FOREIGN PATENT DOCUMENTS

JP    2003044756 A    2/2003

OTHER PUBLICATIONS

"Amazon Echo: Always Ready, Connected, and Fast", Amazon, Jan. 28, 2016, Copyright 1996-2016. <http://www.amazon.com/dp/B00X4WHP5E>.

*Primary Examiner* — Michael Ortiz-Sanchez
(74) *Attorney, Agent, or Firm* — William H. Hartwell (57) ABSTRACT

Software that generates list items from user conversations by performing the following operations: (i) capturing natural language statement(s) spoken by a first user; (ii) converting the natural language statement(s) to text; (iii) performing a natural language processing (NLP) analysis of the text to identify a first list item, wherein the first list item includes one or more words in the text that are likely to be included in a list associated with the first user; and/or performing a first list action utilizing the first list item based, at least in part, on the performed NLP analysis, wherein the first list action includes modifying a first list associated with the first user.

19 Claims, 3 Drawing Sheets

(51) Int. Cl.
*G10L 15/00* (2013.01)
*G10L 21/00* (2013.01)
*G10L 25/00* (2013.01)
*G06F 17/30* (2006.01)

(58) Field of Classification Search
CPC .......... G06Q 10/1095; G06Q 30/0251; G06Q 30/0633; H04H 60/46; G10L 15/26; G10L 17/22; G10L 15/18; G10L 15/1822; G10L 15/22; H04M 1/72561; H04M 2201/40; H04M 3/42; H04L 41/22; H04L 67/22; H04L 43/045; H04L 43/08; H04L 67/2861
See application file for complete search history.

(56) References Cited

U.S. PATENT DOCUMENTS

| | | | |
|---|---|---|---|
| 6,658,389 B1 | 12/2003 | Alpdemir | |
| 7,925,507 B2* | 4/2011 | Weng | G06F 17/278 |
| | | | 704/257 |
| 8,200,847 B2 | 6/2012 | LeBeau et al. | |
| 8,566,102 B1* | 10/2013 | Bangalore | G10L 15/22 |
| | | | 704/270.1 |
| 8,977,555 B2 | 3/2015 | Torok et al. | |
| 9,020,824 B1 | 4/2015 | Govil | |
| 9,047,870 B2 | 6/2015 | Ballinger et al. | |
| 9,070,366 B1 | 6/2015 | Mathias et al. | |
| 9,201,927 B1* | 12/2015 | Zhang | G06F 17/271 |
| 9,424,840 B1* | 8/2016 | Hart | G10L 15/22 |
| 9,548,050 B2* | 1/2017 | Gruber | G06F 17/3087 |
| 9,910,886 B2* | 3/2018 | Adams, Jr. | G06F 17/30401 |
| 2009/0063473 A1* | 3/2009 | Van Den Berg | G06F 17/2785 |
| 2009/0313299 A1* | 12/2009 | Bonev | G06Q 10/109 |
| 2012/0173373 A1* | 7/2012 | Soroca | G06F 17/30867 |
| | | | 705/26.3 |
| 2012/0254763 A1* | 10/2012 | Protopapas | G06F 17/30554 |
| | | | 715/738 |
| 2014/0019128 A1 | 1/2014 | Riskin et al. | |
| 2014/0033071 A1* | 1/2014 | Gruber | G06Q 10/1097 |
| | | | 715/752 |
| 2014/0278363 A1* | 9/2014 | Allen | G06F 17/2785 |
| | | | 704/9 |
| 2015/0149182 A1* | 5/2015 | Kalns | G10L 15/18 |
| | | | 704/275 |
| 2015/0179175 A1 | 6/2015 | Torok et al. | |
| 2015/0205782 A1 | 7/2015 | Subramanya et al. | |
| 2015/0348538 A1* | 12/2015 | Donaldson | G10L 15/08 |
| | | | 704/235 |
| 2016/0071149 A1* | 3/2016 | Farshori | G06Q 30/0253 |
| | | | 705/14.51 |
| 2016/0188535 A1* | 6/2016 | Allen | G06F 17/30011 |
| | | | 704/9 |
| 2016/0189717 A1* | 6/2016 | Kannan | G10L 17/22 |
| | | | 704/275 |
| 2016/0321232 A1* | 11/2016 | Tan | G06F 17/30539 |
| 2016/0335572 A1* | 11/2016 | Bennett | G06Q 10/06311 |

* cited by examiner

CONVERSATIONAL LIST MANAGEMENT

BACKGROUND

The present invention relates generally to the field of productivity software, and more particularly to list management applications.

The field of productivity software generally includes applications that allow users to produce information, such as documents, presentations, worksheets, databases, charts, graphs, digital music, digital video, digital photographs, and the like. A subfield of the field of productivity software is list-making (or "list management") applications which, simply put, are applications designed to allow users to make lists. List-making applications can range in complexity, from comprehensive task management applications to simple programs for creating text-based lists.

Speech recognition is a field that involves recognizing and translating spoken language into text using computers. Speech recognition applications can include voice user interfaces such as voice calling, call routing, home automation appliance control, search, data entry, and speech-to-text processing.

SUMMARY

According to an aspect of the present invention, there is a method, computer program product and/or system that performs the following operations (not necessarily in the following order): (i) capturing natural language statement(s) spoken by a first user; (ii) converting the natural language statement(s) to text; (iii) performing a natural language processing (NLP) analysis of the text to identify a first list item, wherein the first list item includes one or more words in the text that are likely to be included in a list associated with the first user; and/or (iv) performing a first list action utilizing the first list item based, at least in part, on the performed NLP analysis, wherein the first list action includes modifying a first list associated with the first user.

DETAILED DESCRIPTION

List management applications can be helpful and valuable tools for end users of electronic devices. However, in many cases, users of list management applications may think—and speak—of list items at times when a list management application is not immediately open, available, or convenient. Embodiments of the present invention automatically generate list items from user conversations, thereby allowing users to create or update lists without manually performing operations in a list management application. In this way, as will be discussed in further detail below, users of list management applications can manage their lists without having to pause or otherwise interrupt their current task. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
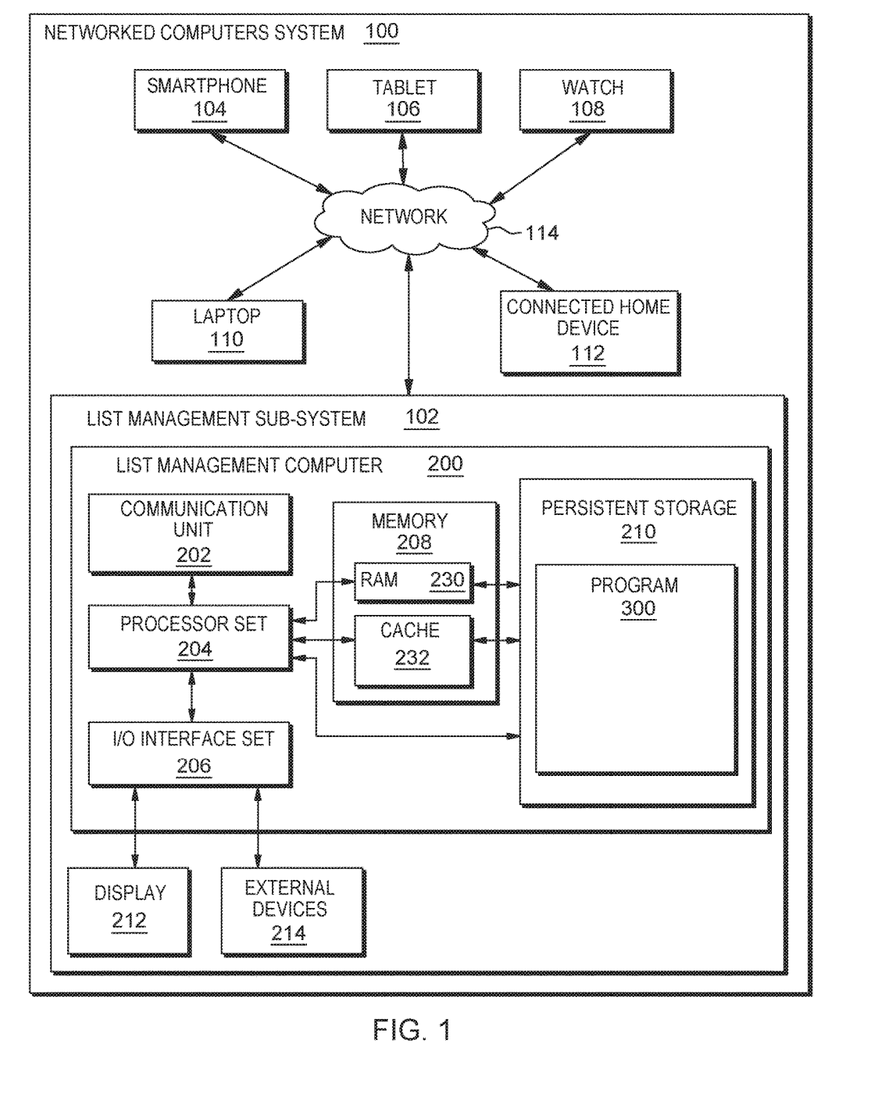
FIG. 1 is a block diagram view of a first embodiment of a system according to the present invention.

An embodiment of a possible hardware and software environment for software and/or methods according to the present invention will now be described in detail with reference to the Figures. FIG. 1 is a functional block diagram illustrating various portions of networked computers system 100, including: list management sub-system 102; smartphone 104; tablet 106; smartwatch 108; laptop 110; connected home device 112; list management computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with list management computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
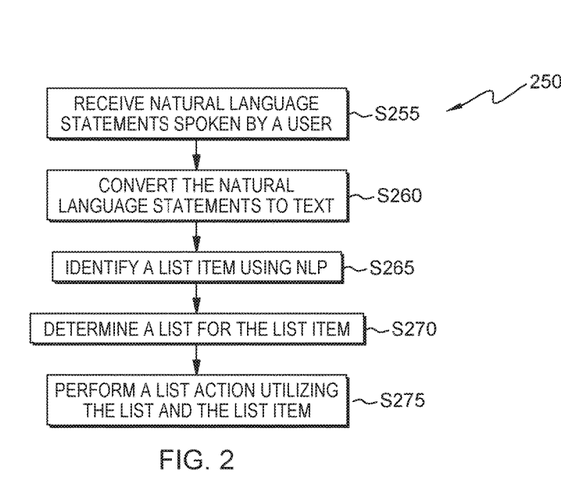
FIG. 2 is a flowchart showing a first embodiment method performed, at least in part, by the first embodiment system.
Figure 3:
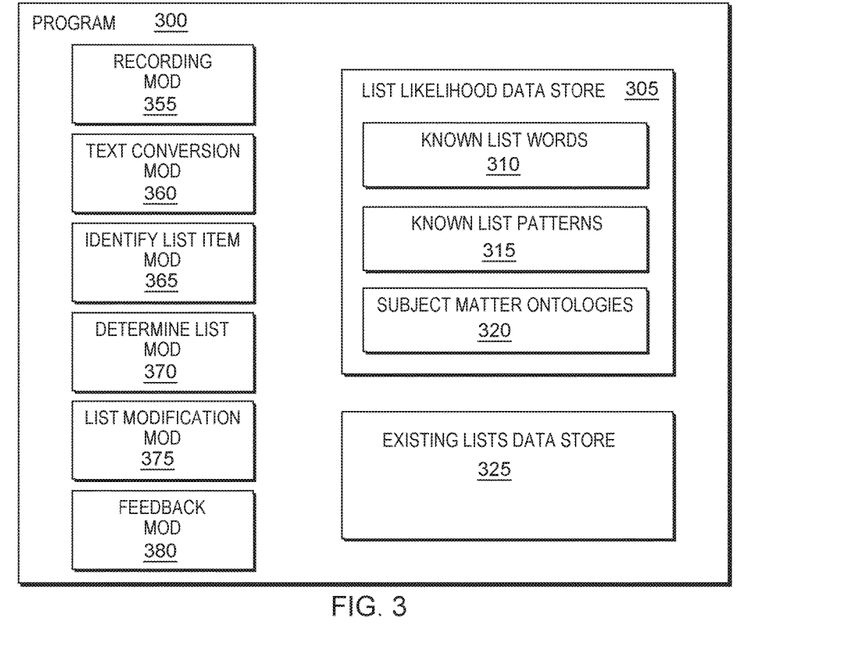
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks). Generally speaking, in this example embodiment (also referred to in this sub-section as the "present embodiment," the "present example," the "present example embodiment," and the like), program 300 receives natural language statements spoken by a user of a list management application and automatically creates list item(s) based on those statements. It should be noted that this example embodiment is used herein for example purposes, in order to help depict the scope of the present invention. As such, other embodiments (such as embodiments discussed in the Further Comments and/or Embodiments sub-section, below) may be configured in different ways or refer to other features, advantages, and/or characteristics not fully discussed in this sub-section.

The following discussion generally refers to "lists" associated with various users of a computer system. As used herein, a list can be any ordered or unordered collection of items that is manageable via a list management application (see the Definitions sub-section). Some general examples of lists include: (i) a "to-do" list of tasks to complete; (ii) a list of items that may or may not include associated and/or implied tasks to complete (for example, a grocery list); (iii) a list of instructions for completing a task; (iv) a list of favorite items; (v) a list of locations (for example, restaurants) in a particular geographic area; (vi) a list of people attending an event; and (vii) a contact list or list of friends. These are not meant to be limiting, however, and lists can include a wide variety of ordered or unordered collections of items that are manageable via list management applications.

Processing begins at operation S255, where recording module ("mod") 355 receives natural language statements spoken by a user of a list management application. The natural language statements spoken by the user may be captured in any of a wide variety of ways, including, but not limited to: (i) via microphone(s); (ii) via camera(s) and associated lip-reading software; (iii) via vocal cord vibration detector(s); and/or (iv) via any other device(s) capable of capturing spoken utterances. In the present example embodiment, the natural language statements are captured by a plurality of microphone enabled client devices associated with the user. Specifically, the natural language statements are captured via microphones on the user's smartphone 104, tablet 106, smartwatch 108, laptop 110, and/or connected home device 112 (see FIG. 1) and subsequently transferred to program 300 of list management computer 200 for processing.

As used herein, "natural language statements" may be any spoken utterances that are capable of being converted into natural language text (see the Definitions sub-section). For example, a natural language statement may include: (i) a single word; (ii) a short phrase; (iii) an entire sentence; (iv) a group of multiple sentences; and/or (v) a group of disorganized words or words otherwise organized in a non-sentence format. In many cases, all audio input (not just natural language statements) may be initially captured by a client device, with non-natural language audio later being ignored or deleted during the conversion process (see the discussion of operation S260, below). Additionally, in some embodiments, the natural language statements may be spoken by a plurality of individuals (that is, more than a single user). In these embodiments, users may be treated in substantially similar ways (for example, all user statements are processed equally without differentiation), or some users may be prioritized based on various factors. For example, in an embodiment, the primary user of a list management application may choose to allow family members and friends to be added as "secondary" users whose spoken statements are captured but treated differently in subsequent steps. For a further discussion of multiple user situations, see the Further Comments and/or Embodiments sub-section of this Detailed Description section.

It should be understood that in certain cases, the capturing of the natural language statements takes place automatically in the background, without the user having to manually select a recording or list-making feature. This is due, at least in part, to the fact that many times, users will speak their list items out loud—for example, during a conversation—before deciding to enter them into a list management application. This feature may be configurable by a user, and may be enabled with privacy and/or security features in order to provide the user with the desired amount of flexibility while preventing the unwanted transmission of data. For example, in the present embodiment, where client smartphone 104, tablet 106, smartwatch 108, laptop 110, and connected home device 112 are connected to list management computer 200 of list management sub-system 102 over network 114, the user may not want all of the user's conversations to automatically be sent to list management computer 200 for processing. In this case, the user may select (for example, via a "user preferences" menu) for only the portions of conversations that include certain list-indicating words or phrases (or "list-indicators) to be sent to list management computer 200 for further processing, with initial capturing and partial conversion to text taking place at the respective client device.

Processing proceeds to operation S260, where text conversion mod 360 converts the received natural language statements to text. Many of a wide variety of known (or yet to be known) methods for text conversation may be used, with the output being a set of natural language text that is ready for natural language processing (NLP) related functions to be performed in subsequent operations. The conversion of the natural language statements to text may also help remove any unwanted statements uttered by individuals who are not the user. For example, in an embodiment where only a single user's statements are to be analyzed, program 300 may filter out any non-user statements using text conversion mod 360. This filtering may alternatively be performed by recording mod 355 at operation S255 (discussed above).

Processing proceeds to operation S265, where identify list item mod 365 identifies a list item from the text using various NLP related functions. Any of a wide variety of known (or yet to be known) NLP related functions may be used, including, but not limited to: sentence splitting, tokenization, part of speech tagging, chunking, dependency parsing, anaphora resolution, and the like. The identified list item is any word or set of words that may be potentially included in a user-associated list. In many cases, including the present example embodiment, the identification of list items is based on a determined likelihood that the word(s) are to be included in a list, based on a variety of likelihood factors. In the present embodiment, the likelihood factors are included in list likelihood data store 305 (see FIG. 3), which includes known list words data store 310, known list patterns data store 315, and subject matter ontologies 320.

In the present embodiment, identify list item mod 365 compares word(s) in the text to known list-indicating words in known list words data store 310. If the words are similar to known list-indicating words in data store 310 (for example, "first," "second," "beginning," and/or "next"), then it is likely that the words in the text are to be included in a list. Similarly, identify list item mod 365 compares pattern(s) in the text to patterns in known list patterns data store 315. If patterns in the text are similar to patterns in data store 315, then it is likely that the patterns in the text represent list items. An example of a pattern that may be included in known list patterns data store 315 is a directional word (potentially identified from known list words data store 310) followed by a prepositional phrase. For example, when the word "go" is followed by the prepositional phrase "to the store", the combined phrase "go to the store" is a phrase that is likely to be included in a list.

Identify list item mod 365 may also compare words in the text to other words that might be included in lists. For example, mod 365 may compare words in the text to words from lists in existing lists store 325, using subject matter ontologies 320 to determine whether the words are of a similar type such that they would be likely to be included in the same list. Additionally, or alternatively, mod 365 may compare words in the text to each other, to determine if multiple words in the text are similar enough to warrant separate list items. Some examples of this analysis are provided in the Further Comments and/or Embodiments sub-section, below.

In certain embodiments, in addition to identifying that a word or set of words is a list item, identify list item mod 365 may also determine whether the list item is likely to be a list-starting item or a list-continuing item. This can be determined, for example, using various NLP related functions to detect list-starting indicators and list-continuing indicators, which will be discussed in further detail below in the Further Comments and/or Embodiments sub-section of this Detailed Description section.

In certain embodiments, the identification of list items in the text is based on factors specific to the user being recorded. Embodiments of the present invention recognize that lists may be rather personal, and as such a more personalized identification of list items may be performed. For example, when identify list item mod 365 compares words in the text to words from lists in existing lists store 325, mod 365 may look only at lists associated with the user. In this way, identify list item mod 365 may identify list items that are of a particular relevance to the user while discarding potential list items that are determined to be not relevant based on the data. Alternatively, in other embodiments, identify list item mod 365 may identify list items from lists of other users related to the user for further insight into whether the text includes new list items.

Processing proceeds to operation S270, where determine list mod 370 determines a list for the identified list item (also referred to as the "present list item"). As mentioned above, existing lists store 325 includes existing lists that may or may not be associated with the user. In the present operation, mod 370 scores the identified list item against the lists in existing lists store 325 that are associated with the user. Generally speaking, the higher the score, the more likely that the list item should correspond to the given list. Some examples of factors that may result in higher scores include, but are not limited to: (i) the present list item and items in the existing list are of a similar type, are included in a similar category, or are otherwise ontologically related (determined, for example, using subject matter ontologies 320); (ii) the present list item is similar to (or identical to) an item in an existing list; (iii) the present list item includes the same subject as one or more list items in an existing list; and/or (iv) an existing list was created or modified very recently (indicating that the present list item belongs to the same list that the user was recently speaking about). Once scoring is complete, mod 370 selects a list based on the scoring (for example, by selecting the list with the highest score).

In some cases, mod 370 may determine to create a new list for the list item. This may happen when: (i) there is not a suitable match for the list item in existing lists data store 325 (for example, if the scoring does not meet a threshold); and/or (ii) the list item has been determined to be a list-starting item. In such a case, mod 370 may create the new list and save it to existing lists data store, either before or after the performance of a list action in the subsequent operation (to be discussed below).

Although the above-discussed operations provide an example of a way for a computer program to identify list items in text and determine corresponding lists, it should be noted that in other embodiments these operations may be performed in other ways. For example, some embodiments utilize a deep question answering (QA) system capable of answering questions presented in natural language. In these embodiments, the deep QA system can be trained with sample data such that the results of the above-discussed operations can be duplicated by asking one or more questions to the deep QA system. For a further discussion of deep QA systems, including examples of possible questions, see the Further Comments and/or Embodiments sub-section, below.

Processing proceeds to operation S275, where list modification mod 375 performs a list action utilizing the determined list and the identified list item. Example list actions include, but are not limited to: (i) adding the list item to the list at a particular location; (ii) removing the list item from the list; and/or (iii) modifying an existing list item in the list based on the identified list item. The relevant list action for a given list item/list pair may be determined in a wide variety of ways, including, for example, by using various NLP related functions (such as the NLP related functions mentioned above). In one example, if the list item is determined to be ontologically related to the list and not particularly similar to any of the existing list items, mod 375 determines that the list item should be added to the list as a new list item. In another example, if the list item is determined to be similar (or perhaps identical) to an existing list item, and that list item was preceded in the text by one or more words indicating a desired deletion, mod 375 determines to remove the existing list item from the list. In still another example, if the list item is determined to be similar (or perhaps identical) to an existing list item, and that list item was preceded in the text by one or more words indicating that the list item has been completed, mod 375 determines to modify the existing list item and mark it as completed. In yet another example, if the list item is determined to be similar (but not identical) to an existing list item, but includes additional information than that included in the existing list item, mod 375 determines to modify the existing list item to include the additional information.

In some embodiments, when adding a list item to a list in operation S275, list modification mod 375 also determines a particular location in the list to add the list item to. This can be based on a variety of factors, including, for example, an NLP analysis (using NLP related functions) of the text from which the list item was originally identified. For example, if the text includes indicators of order—such as "first," "last," "beginning," "end", or "third"—then mod 375 may determine to use those indicators to place the list item accordingly. Additionally, in certain embodiments, mod 375 may contextually analyze the present list item and other list items in the list to determine the proper location. For example, if the present list item is "purchase a hat" and the list includes an item of "wear a hat to the game," mod 375 may determine that "purchase a hat" should precede "wear a hat to the game" so that the user purchases a hat before attempting to wear one.

In some embodiments, program 300 obtains feedback from the user before or after performing the list action in operation S275. For example, in the present embodiment, feedback mod 380 of program 300 may provide the user with an opportunity to accept or reject a determined list action prior to performing the list action (using, for example, a user interface of smartwatch 108). In another example, feedback mod 380 may present a summary of performed list action(s) to the user and provide the user with an opportunity to "undo" any of the performed list action(s) (using, for example, laptop 110). In yet another (or the same) example, feedback mod 380 may provide the user with an opportunity to modify an order of the list action(s). Additionally, feedback mod 380 may save a history of previous feedback provided by the user in order to better predict which list items and list actions are likely (for example, by training a deep QA model).

III. Further Comments and/or Embodiments

Some embodiments of the present invention recognize the following facts, potential problems and/or potential areas for improvement with respect to the current state of the art: (i) existing list-management applications allow users to create lists, but only after manually opening an application and explicitly indicating that a new list and/or list item is to be created; (ii) many times, people talk through lists in conversations before deciding to open list-managing applications to create the lists; and/or (iii) in many cases, by the time a user remembers to open a list-managing application to create and/or add items to a list, the user may have forgotten all of the items to include in the list.

Some embodiments of the present invention may include one, or more, of the following features, characteristics and/or advantages: (i) generating lists during conversations without requiring that a single user state the list in a finalized order; (ii) listening/monitoring user conversations in the background (based, for example, on user preference); (iii) utilizing deep QA processing techniques to score incoming sentences; (iv) scoring incoming sentences in a deep QA system based on the question: "is this the start of a list?"; (v) scoring incoming sentences in a deep QA system based on the question: "is this a continuation of a known list?"; and/or (vi) automatically sorting, optimizing, subsetting, and/or resolving lists based on user conversations.

Some embodiments of the present invention use NLP related functions to specifically determine points in conversations that identify the start of a list. For example, some embodiments rely on passage analysis and scoring to determine whether sentences contain list starting indicators. Some examples of list-starting indicators include: (i) explicit indicators (for example, the word "first"); and/or (ii) prepositions of directions (for example, the word "go", followed later by the word "then").

Similarly, embodiments of the present invention may rely on NLP related functions to analyze and score sentences for continuations of a list. Some examples of list-continuing indicators include: (i) explicit indicators (for example, the word "next"); and (ii) continuations of similar items as determined by ontologies or other relationships (for example, "apples" and "bananas" could be considered "grocery list items").

Figure 4:
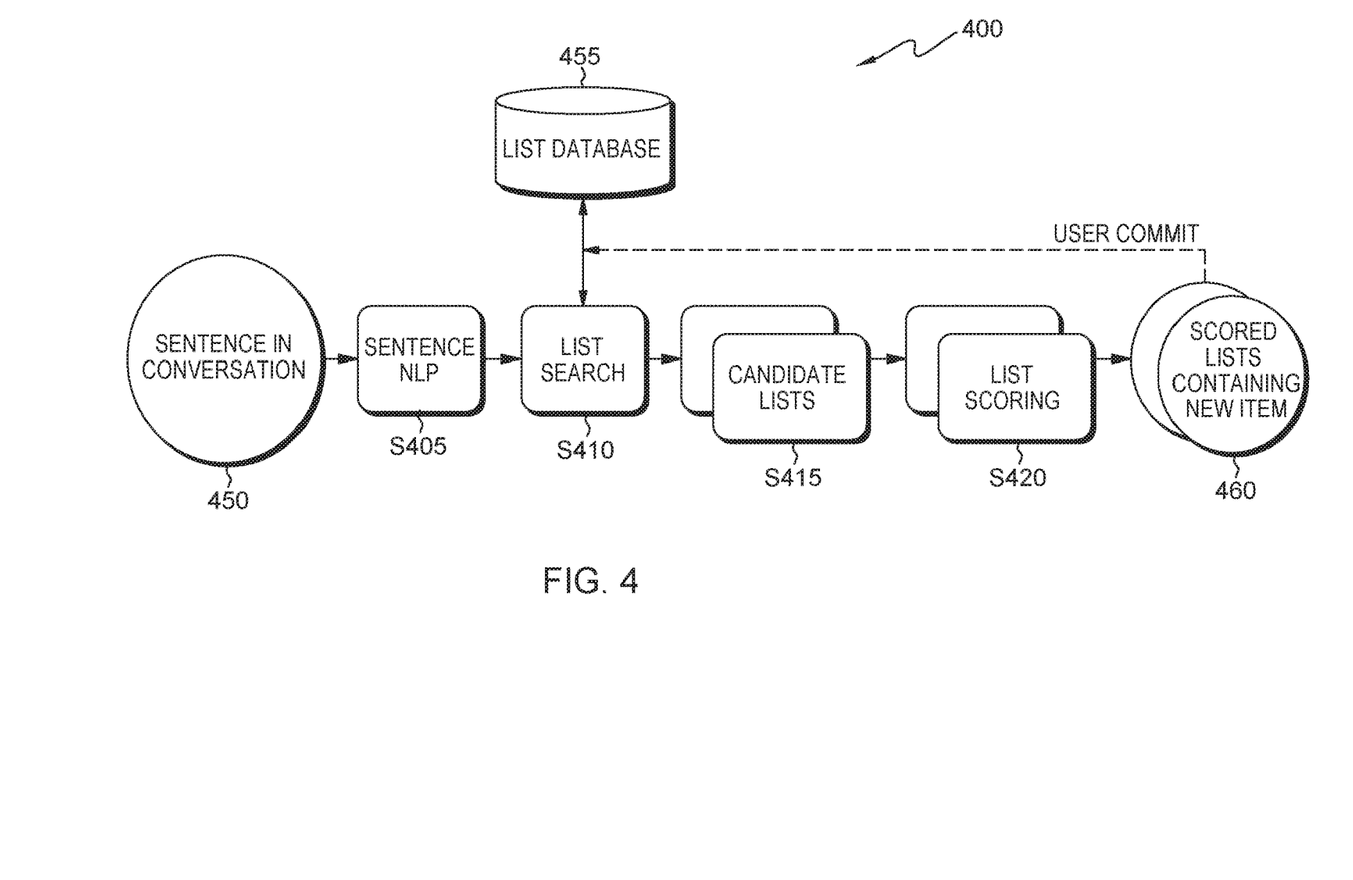
FIG. 4 is a flowchart depicting a method according to an embodiment of the present invention.

FIG. 4 shows flowchart 400 depicting a method according to an embodiment of the present invention. The method is performed by a list analyzing program (not shown) that receives sentence 450 from an uttered conversation of a user. After receiving sentence 450, the program performs NLP (S405) to extract list items, and then searches (S410) list database 455 for potential existing lists to add the new list items to. The program then retrieves candidate lists (S415) as a result of the search and scores (S420) those lists based on how likely they are to align with the extracted list items. The resulting list of scored lists 460 are then presented to the user for approval. If the user approves a list to add the list items to, that list is then committed back to list database 455 for future operations. Alternatively, if the user does not select a list, or if there are no candidate lists with sufficient scores, the program determines that the list items belong to a new list (not shown), and correspondingly creates the new list with the list items.

In some embodiments, multiple users are able to add items to lists. In these embodiments, the originating voice of a list item may be denoted in the list. For example, when an item is added to a list, the name of the person who spoke the item (determined, for example, using voice recognition software) would be appended to the item for later vetting. Alternatively, or additionally, if an item is added by a non-approved user (or a non-administrative user), that item could be immediately removable by an approved user (or admin user) via voice command. In one example, a first user creates a list of places for the user's partner to stop on the way home from work. While the first user is adding items to the list, if a second user (a child named Tommy, for example) interjects to say "a toy store", the first user could either explicitly say "ignore Tommy", thereby causing the program to remove the item from the list, or later manually remove (or ignore) the item based on the fact that it includes a tag with the name "Tommy."

Some illustrative examples follow. In a first example, a vocal list application listens to a conversation between two users: a first person (Person 1) and a second person (Person 2). The first person begins the conversation by saying, "I am going to the store to pick up some breakfast cereal." The application then queries existing lists and finds no matches. As a result, the application creates a new list (List 1) with two items: (i) go to store; and (ii) get breakfast cereal. Furthermore, in addition to the list items themselves, the application also adds contexts to each item in order to identify the subject of each item and the requester of each item. The resulting list is as follows:

| List 1a | | |
|---|---|---|
| Item | Context(Subject) | Context(Requestor) |
| Go to store | Person 1 | Person 1 |
| Get breakfast cereal | Person 1 | Person 1 |

The conversation continues with the second person saying, "Can you also pickup some orange juice?" The vocal list application finds the appropriate list (List 1) by scoring the new sentence against the existing list entries. The scoring may include, but is not limited to, the following: (i) detecting the subject as "Person 1"; (ii) determining that the list was generated very recently; and (iii) determining that the list deals with a "grocery store" which is strongly related to "orange juice." Based on the scoring, the application adds a new item to List 1. The resulting list is as follows:

| List 1b | | |
|---|---|---|
| Item | Context(Subject) | Context(Requestor) |
| Go to store | Person 1 | Person 1 |
| Get breakfast cereal | Person 1 | Person 1 |
| Pickup orange juice | Person 1 | Person 2 |

The conversation continues with the first person saying, "Oh, I just remembered that first I need to get some gas." The vocal list application finds the appropriate list (List 1) based, at least in part, on the following scoring: (i) detecting the subject as "Person 1"; and (ii) determining that the list was generated very recently. Based on the scoring, the application adds a new item to List 1. Based on the usage of the word "first" (identified, for example, using NLP related functions), the program determines that the new item should be first on the list. The resulting list is as follows:

| List 1c | | |
|---|---|---|
| Item | Context(Subject) | Context(Requestor) |
| Get gas | Person 1 | Person 1 |
| Go to store | Person 1 | Person 1 |
| Get breakfast cereal | Person 1 | Person 1 |
| Pickup orange juice | Person 1 | Person 2 |

In a second example, a vocal list application listens to words being spoken by Person 3, a user of the vocal list application who has the application enabled on his phone. Person 3 begins by saying, "I need to pickup some pie filling." The application queries existing lists and finds no matches. As a result, a new list (List 2) is created with an entry for picking up pie filling. The resulting list is as follows:

| List 2a | | |
|---|---|---|
| Item | Context(Subject) | Context(Requestor) |
| Pickup pie filling | Person 3 | Person 3 |

Person 3 continues by saying, "Looks like I'll need some pie crust as well." The vocal list application finds the appropriate list (List 2) by scoring the new sentence against the existing list entries. The scoring may include, but is not limited to, the following: (i) detecting the subject as Person 3; (ii) determining that the list was generated very recently; and (iii) determining that the list includes pie ingredients. Based on the scoring, the application adds a new item to List 2. The resulting list is as follows:

| List 2b | | |
|---|---|---|
| Item | Context(Subject) | Context(Requestor) |
| Pickup pie filling | Person 3 | Person 3 |
| Get pie crust | Person 3 | Person 3 |

At this point, another person—Person 4—steps into the room and starts to talk to Person 3 about their child, Sally.

Person 3 responds by saying, "I'll need to talk to Sally about her homework." The vocal list application queries existing lists and finds no matches via scoring. Although there are lists related to Person 3 and lists that were recently generated, the concepts and items within those lists are determined to be not related enough to score as a continuation of these lists (for example, Sally and homework are not related to pie filling and pie crust). As a result, a new list (List 3) is created as follows:

| List 3a | | |
|---|---|---|
| Item | Context(Subject) | Context(Requestor) |
| Talk to Sally about homework | Person 3 | Person 3 |

In this way, the vocal list application will continue to monitor the conversations of Person 3 to further identify potential list matches or new list opportunities.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User: includes, but is not necessarily limited to, the following: (i) a single individual human; (ii) an artificial intelligence entity with sufficient intelligence to act as a user; and/or (iii) a group of related users.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Natural Language: any language used by human beings to communicate with each other.

Natural Language Processing: any derivation of meaning from natural language performed by a computer.

List management application: any application that allows a user of a computer to create and manage sets of items via a user interface.

List: any ordered or unordered collection of items that is manageable via a list management application, not including list data structures (or data types) commonly used in computer programming, except to the extent with which such data structures may correspond to user-manageable lists included in list management applications.

What is claimed is:

1. A computer-implemented method comprising:
   capturing, by one or more processors, a set of natural language statements spoken by a plurality of individuals;
   identifying, by one or more processors, natural language statement(s) of the set of natural language statements that have been spoken by a first user associated with a list management application;
   filtering, by one or more processors, the set of natural language statements to remove statement(s) spoken by individual(s) other than the first user;
   converting, by one or more processors, the filtered set of natural language statements to text;
   performing, by one or more processors, a natural language processing (NLP) analysis of the text to identify a first list item, wherein the first list item includes one or more words in the text that are likely to be included in a first list associated with the first user in the list management application, wherein the first list corresponds to a first data structure stored in a database;
   determining, by one or more processors, whether the first list item is a list-starting item or a list-continuing item, based, at least in part, on a set of list-starting indicators and a set of list-continuing indicators, wherein the set of list-starting indicators includes: (i) one or more directional prepositions and their corresponding prepositional phrases, and (ii) a score generated by a deep question answering (QA) system based on asking the deep QA system whether the first list item is the start of a list, and wherein the set of list-continuing indicators includes: (i) one or more words or phrases that have ontological relationships to items in other, existing lists associated with the first user corresponding to other, existing data structures stored in the database, and (ii) a score generated by the deep QA system based on asking the deep QA system whether the first list item is a continuation of a known list; and
   performing, by one or more processors, a first list action in the list management application utilizing the first list item based, at least in part, on the determination of whether the first list item is a list-starting item or a list-continuing item, wherein the first list action includes modifying the first data structure corresponding to the first list, wherein if the first list item is a list-starting item, the first list action includes modifying the first data structure to begin the first list with the first list item, and wherein if the first list item is a list-continuing item, the first list action includes modifying the first data structure to include the first list item in the first list at a location other than the beginning of the first list.

2. The computer-implemented method of claim 1, further comprising:
   scoring, by one or more processors, the first list item against a plurality of lists associated with the first user in the list management application, wherein each list of the plurality of lists corresponds to a respective data structure stored in the database; and selecting, by one or more processors, the first list from the plurality of lists based, at least in part, on the scoring.

3. The method of claim 2, further comprising:

upon selecting the first list, presenting, by one or more processors, via a display device, the first list to the first user; and providing, by one or more processors, the first user with an opportunity to approve the selection of the first list using a user interface.

4. The computer-implemented method of claim 1, further comprising:

scoring, by one or more processors, the first list item against a plurality of lists associated with the first user in the list management application, wherein each list of the plurality of lists corresponds to a respective data structure stored in the database;

responsive to determining that the first list item does not meet a score threshold for any of the lists of the plurality of lists, creating, by one or more processors, the first list and a corresponding data structure.

5. The computer-implemented method of claim 1, further comprising:

identifying, by one or more processors, a second list item based, at least in part, on the performed NLP analysis, wherein the second list item includes one or more words in the text that are likely to be included in a list associated with the first user in the list management application;

scoring, by one or more processors, the second list item against a plurality of lists associated with the first user in the list management application, wherein each list of the plurality of lists corresponds to a respective data structure stored in the database;

selecting, by one or more processors, the first list from the plurality of lists based, at least in part, on the scoring; and performing, by one or more processors, a second list action in the list management application utilizing the second list item based, at least in part, on the performed NLP analysis and the selection of the first list, wherein the second list action includes modifying the first data structure corresponding to the first list.

6. The computer-implemented method of claim 1, further comprising:

identifying, by one or more processors, a second list item based, at least in part, on the performed NLP analysis, wherein the second list item includes one or more words in the text that are likely to be included in a list associated with the first user in the list management application;

scoring, by one or more processors, the second list item against a plurality of lists associated with the first user in the list management application, wherein each list of the plurality of lists corresponds to a respective data structure stored in the database;

responsive to determining that the second list item does not meet a score threshold for any of the lists of the plurality of lists, creating, by one or more processors, a second list and a corresponding second data structure; and performing, by one or more processors, a second list action in the list management application utilizing the second list item based, at least in part, on the performed NLP analysis and the creation of the second list, wherein the second list action includes modifying the second data structure corresponding to the second list.

7. The computer-implemented method of claim 1, further comprising:

identifying, by one or more processors, natural language statement(s) spoken by a second user associated with the list management application;

converting, by one or more processors, the natural language statement(s) spoken by the second user to text;

performing, by one or more processors, a natural language processing (NLP) analysis of the text of the converted natural language statement(s) spoken by the second user to identify a second list item, wherein the second list item includes one or more words in the text of the converted natural language statement(s) spoken by the second user that are likely to be included in the first list associated with the first user in the list management application; and responsive to determining list modification permissions for the second user in the list management application, performing, by one or more processors, a second list action in the list management application utilizing the second list item based, at least in part, on the performed NLP analysis and the determined list modification permissions, wherein the second list action includes modifying the first data structure corresponding to the first list associated with the first user.

8. A computer program product comprising a computer readable storage medium having stored thereon:

program instructions to capture a set of natural language statements spoken by a plurality of individuals;

program instructions to identify natural language statement(s) of the set of natural language statements that have been spoken by a first user associated with a list management application;

program instructions to filter the set of natural language statements to remove statement(s) spoken by individual(s) other than the first user;

program instructions to convert the filtered set of natural language statements to text;

program instructions to perform a natural language processing (NLP) analysis of the text to identify a first list item, wherein the first list item includes one or more words in the text that are likely to be included in a first list associated with the first user in the list management application, wherein the first list corresponds to a first data structure stored in a database;

program instructions to determine whether the first list item is a list-starting item or a list-continuing item, based, at least in part, on a set of list-starting indicators and a set of list-continuing indicators, wherein the set of list-starting indicators includes: (i) one or more directional prepositions and their corresponding prepositional phrases, and (ii) a score generated by a deep question answering (QA) system based on asking the deep QA system whether the first list item is the start of a list, and wherein the set of list-continuing indicators includes: (i) one or more words or phrases that have ontological relationships to items in other, existing lists associated with the first user corresponding to other, existing data structures stored in the database, and (ii) a score generated by the deep QA system based on asking the deep QA system whether the first list item is a continuation of a known list; and program instructions to perform a first list action in the list management application utilizing the first list item based, at least in part, on the determination of whether the first list item is a list-starting item or a list-continuing item, wherein the first list action includes modifying the first data structure corresponding to the first list, wherein if the first list item is a list-starting item, the first list action includes modifying the first data structure to begin the first list with the first list item, and wherein if the first list item is a list-continuing item, the first list action includes modifying the first data structure to include the first list item in the first list at a location other than the beginning of the first list.

9. The computer program product of claim 8, wherein the computer readable storage medium has further stored thereon:
   program instructions to score the first list item against a plurality of lists associated with the first user in the list management application, wherein each list of the plurality of lists corresponds to a respective data structure stored in the database; and
   program instructions to select the first list from the plurality of lists based, at least in part, on the scoring.

10. The computer program product of claim 8, wherein the computer readable storage medium has further stored thereon:
    program instructions to score the first list item against a plurality of lists associated with the first user in the list management application, wherein each list of the plurality of lists corresponds to a respective data structure stored in the database; and
    program instructions to, responsive to determining that the first list item does not meet a score threshold for any of the lists of the plurality of lists, create the first list and a corresponding data structure.

11. The computer program product of claim 8, wherein the computer readable storage medium has further stored thereon:
    program instructions to identify a second list item based, at least in part, on the performed NLP analysis, wherein the second list item includes one or more words in the text that are likely to be included in a list associated with the first user in the list management application;
    program instructions to score the second list item against a plurality of lists associated with the first user in the list management application, wherein each list of the plurality of lists corresponds to a respective data structure stored in the database;
    program instructions to select the first list from the plurality of lists based, at least in part, on the scoring; and
    program instructions to perform a second list action in the list management application utilizing the second list item based, at least in part, on the performed NLP analysis and the selection of the first list, wherein the second list action includes modifying the first data structure corresponding to the first list.

12. The computer program product of claim 8, wherein the computer readable storage medium has further stored thereon:
    program instructions to identify a second list item based, at least in part, on the performed NLP analysis, wherein the second list item includes one or more words in the text that are likely to be included in a list associated with the first user in the list management application;
    program instructions to score the second list item against a plurality of lists associated with the first user in the list management application, wherein each list of the plurality of lists corresponds to a respective data structure stored in the database;
    program instructions to, responsive to determining that the second list item does not meet a score threshold for any of the lists of the plurality of lists, create a second list and a corresponding second data structure; and
    program instructions to perform a second list action in the list management application utilizing the second list item based, at least in part, on the performed NLP analysis and the creation of the second list, wherein the second list action includes modifying the second data structure corresponding to the second list.

13. The computer program product of claim 8, wherein the computer readable storage medium has further stored thereon:
    program instructions to identify natural language statement(s) spoken by a second user associated with the list management application;
    program instructions to convert the natural language statement(s) spoken by the second user to text;
    program instructions to perform a natural language processing (NLP) analysis of the text of the converted natural language statement(s) spoken by the second user to identify a second list item, wherein the second list item includes one or more words in the text of the converted natural language statement(s) spoken by the second user that are likely to be included in the first list associated with the first user in the list management application; and
    program instructions to, responsive to determining list modification permissions for the second user in the list management application, perform a second list action in the list management application utilizing the second list item based, at least in part, on the performed NLP analysis and the determined list modification permissions, wherein the second list action includes modifying the first data structure corresponding to the first list associated with the first user.

14. A computer system comprising:
    a processor(s) set; and
    a computer readable storage medium;
    wherein:
    the processor set is structured, located, connected and/or programmed to run program instructions stored on the computer readable storage medium; and
    the stored program instructions include:
        program instructions to capture a set of natural language statements spoken by a plurality of individuals;
        program instructions to identify natural language statement(s) of the set of natural language statements that have been spoken by a first user associated with a list management application;
        program instructions to filter the set of natural language statements to remove statement(s) spoken by individual(s) other than the first user;
        program instructions to convert the filtered set of natural language statements to text;
        program instructions to perform a natural language processing (NLP) analysis of the text to identify a first list item, wherein the first list item includes one or more words in the text that are likely to be included in a first list associated with the first user in the list management application, wherein the first list corresponds to a first data structure stored in a database;
        program instructions to determine whether the first list item is a list-starting item or a list-continuing item, based, at least in part, on a set of list-starting indicators and a set of list-continuing indicators, wherein the set of list-starting indicators includes: (i) one or more directional prepositions and their corresponding prepositional phrases, and (ii) a score generated by a deep question answering (QA) system based on asking the deep QA system whether the first list item is the start of a list, and wherein the set of list-continuing indicators includes: (i) one or more words or phrases that have ontological relationships to items in other, existing lists associated with the first user corresponding to other, existing data structures stored in the database, and (ii) a score generated by the deep QA system based on asking the deep QA system whether the first list item is a continuation of a known list; and program instructions to perform a first list action in the list management application utilizing the first list item based, at least in part, on the determination of whether the first list item is a list-starting item or a list-continuing item, wherein the first list action includes modifying the first data structure corresponding to the first list, wherein if the first list item is a list-starting item, the first list action includes modifying the first data structure to begin the first list with the first list item, and wherein if the first list item is a list-continuing item, the first list action includes modifying the first data structure to include the first list item in the first list at a location other than the beginning of the first list.

15. The computer system of claim 14, wherein the stored program instructions further include:

program instructions to score the first list item against a plurality of lists associated with the first user in the list management application, wherein each list of the plurality of lists corresponds to a respective data structure stored in the database; and program instructions to select the first list from the plurality of lists based, at least in part, on the scoring.

16. The computer system of claim 14, wherein the stored program instructions further include:

program instructions to score the first list item against a plurality of lists associated with the first user in the list management application, wherein each list of the plurality of lists corresponds to a respective data structure stored in the database; and program instructions to, responsive to determining that the first list item does not meet a score threshold for any of the lists of the plurality of lists, create the first list and a corresponding data structure.

17. The computer system of claim 14, wherein the stored program instructions further include:

program instructions to identify a second list item based, at least in part, on the performed NLP analysis, wherein the second list item includes one or more words in the text that are likely to be included in a list associated with the first user in the list management application;

program instructions to score the second list item against a plurality of lists associated with the first user in the list management application, wherein each list of the plurality of lists corresponds to a respective data structure stored in the database;

program instructions to select the first list from the plurality of lists based, at least in part, on the scoring; and program instructions to perform a second list action in the list management application utilizing the second list item based, at least in part, on the performed NLP analysis and the selection of the first list, wherein the second list action includes modifying the first data structure corresponding to the first list.

18. The computer system of claim 14, wherein the stored program instructions further include:

program instructions to identify a second list item based, at least in part, on the performed NLP analysis, wherein the second list item includes one or more words in the text that are likely to be included in a list associated with the first user in the list management application;

program instructions to score the second list item against a plurality of lists associated with the first user in the list management application, wherein each list of the plurality of lists corresponds to a respective data structure stored in the database;

program instructions to, responsive to determining that the second list item does not meet a score threshold for any of the lists of the plurality of lists, create a second list and a corresponding second data structure; and program instructions to perform a second list action in the list management application utilizing the second list item based, at least in part, on the performed NLP analysis and the creation of the second list, wherein the second list action includes modifying the second data structure corresponding to the second list.

19. The computer system of claim 14, wherein the stored program instructions further include:

program instructions to identify natural language statement(s) spoken by a second user associated with the list management application;

program instructions to convert the natural language statement(s) spoken by the second user to text;

program instructions to perform a natural language processing (NLP) analysis of the text of the converted natural language statement(s) spoken by the second user to identify a second list item, wherein the second list item includes one or more words in the text of the converted natural language statement(s) spoken by the second user that are likely to be included in the first list associated with the first user in the list management application; and program instructions to, responsive to determining list modification permissions for the second user in the list management application, perform a second list action in the list management application utilizing the second list item based, at least in part, on the performed NLP analysis and the determined list modification permissions, wherein the second list action includes modifying the first data structure corresponding to the first list associated with the first user.

* * * * *